United States Patent [19]
Thompson et al.

[11] 3,734,311
[45] May 22, 1973

[54] WAREHOUSE APPARATUS AND METHOD WITH ARTICLE LABEL PRINTING MEANS

[75] Inventors: Gerald F. Thompson; Richard R. Ridenour, both of Grand Rapids, Mich.

[73] Assignee: Rapistan Incorporated, Grand Rapids, Mich.

[22] Filed: Aug. 20, 1971

[21] Appl. No.: 173,560

Related U.S. Application Data

[63] Continuation-in-part of Ser. No. 811,533, March 28, 1969, abandoned.

[52] U.S. Cl. .............................214/16.4 A, 214/152
[51] Int. Cl. ................................................B65g 1/06
[58] Field of Search.........................214/16.4 A, 152

[56] References Cited

UNITED STATES PATENTS 3,442,403   5/1969   Weir................................214/16.4 A

*Primary Examiner*—Gerald M. Forlenza
*Assistant Examiner*—R. Johnson
*Attorney*—Price, Heneveld, Huizenga & Cooper

[57] ABSTRACT

A system for picking and marshalling articles in a warehouse having a plurality of article storage racks. The system includes a picking unit which moves along the racks and an operator thereon removes articles selectively therefrom. The picking unit includes a printer for printing labels and an applicator for applying them automatically to the article selected. The unit includes, additionally, a system for placing a destination code on the articles so that they can be sorted automatically in the marshalling area. Information regarding the articles to be picked, their location within the storage racks and their destination is transmitted to the picking unit and/or operator through a stack of punched cards, a system computer or the like.

29 Claims, 11 Drawing Figures

Patented May 22, 1973

INVENTORS
RICHARD R. RIDENOUR
GERALD F. THOMPSON
BY
ATTORNEYS

Patented May 22, 1973 3,734,311

INVENTORS
RICHARD R. RIDENOUR
GERALD F. THOMPSON
BY
ATTORNEYS

WAREHOUSE APPARATUS AND METHOD WITH ARTICLE LABEL PRINTING MEANS

CROSS-REFERENCE TO RELATED APPLICATION

This application is a continuation-in-part of co-pending, co-assigned application Ser. No. 811,533 filed on Mar. 28, 1969 now abandoned.

This system relates to warehousing systems and, more particularly, to such systems wherein articles for shipment are picked and directed automatically to a predetermined location in the facility for shipment.

In the field of supplying merchandise to stores or the like, it is often desirable and/or necessary to stock pile the goods at a location central to a number of retail outlets and transfer the goods to the outlets as they are needed. There are, of course, numerous logistic problems in a warehousing scheme of this type since it is necessary to physically remove the articles from the warehouse, marshall them for shipment to particular retail outlets and accurately record shipments which have been made, shipments to be made, the number of items in and out of stock and the like.

It has been proposed heretofore to stack the articles in aisled bins within the warehouse and utilize a mechanized structure upon which an operator rides to gain access to them. In such a system, ordinarily, the operator on the unit physically removes the goods from the bins in accordance with predetermined instructions and places them on a conveyor for transport to the marshalling area. One such system is shown, for example, in U.S. Pat. No. 3,379,321 issued Apr. 23, 1968 and entitled Carrier with an Article Label Unit for a Warehouse System.

Units of the type shown in this patent (as well as the type disclosed and claimed herein) are referred to generally in the art as "batch" picking units since the orders for several stores are picked at one time. They include, consequently, some means for coding the articles as they are picked with a symbol indicative of the particular marshalling area within the warehouse to which they are to be sent for palletizing, shipment and the like. It is desirable in most operations, additionally, to place on the article a legible label or the like containing information relative to the stock number, ordering store and the like.

It is an object of this invention, thus, to provide a system of the type described and components therefor capable of operating with optimum effectiveness in the warehousing and marshalling of articles for shipment to various predetermined locations.

It is an object of this invention, more particularly, to provide a system of the type described wherein there is incorporated apparatus for notifying the operator of the picking unit positively of the goods to be picked and placing on such goods automatically a label containing indicia relating to the destination, order number or the like.

It is still a further object of this invention to provide a system of the type described wherein the picking unit embodies means to place upon the articles a code indicative of the particular marshalling area to which they are to be sent within the system.

It is yet another object of this invention to provide a system of the type described operative in response to recorded information and instructions emanating from a computer, series of punched cards carried on the picking unit or the like.

It is a major object of this invention, thus, to provide a system of the type described wherein articles may be selected from the warehousing in accordance with any predetermined sequence and forwarded on toward their eventual destination with a degree of mechanized efficiency and attendant savings in cost not achievable heretofore.

The objects of this invention, briefly, are accomplished by a system comprising a mobile picking unit movable along a plurality of article storage racks for purposes, at least, of placing on selected articles a label containing predetermined information. Mounted on the unit is a printing means for printing the labels to be applied to the articles. Means are provided in the system for storing the information to be printed on the labels for each such selected article and activating the printing means in accordance with such information.

This invention will be fully understood by those skilled in the art by reference to the following specification and accompanying figures in which:

FIGS. 1A and 1B, viewed in unison, are a fragmentary, perspective view of a warehousing arrangement, picking vehicle and conveyor mechanism suitable for use in the novel system;

Figure 1A:
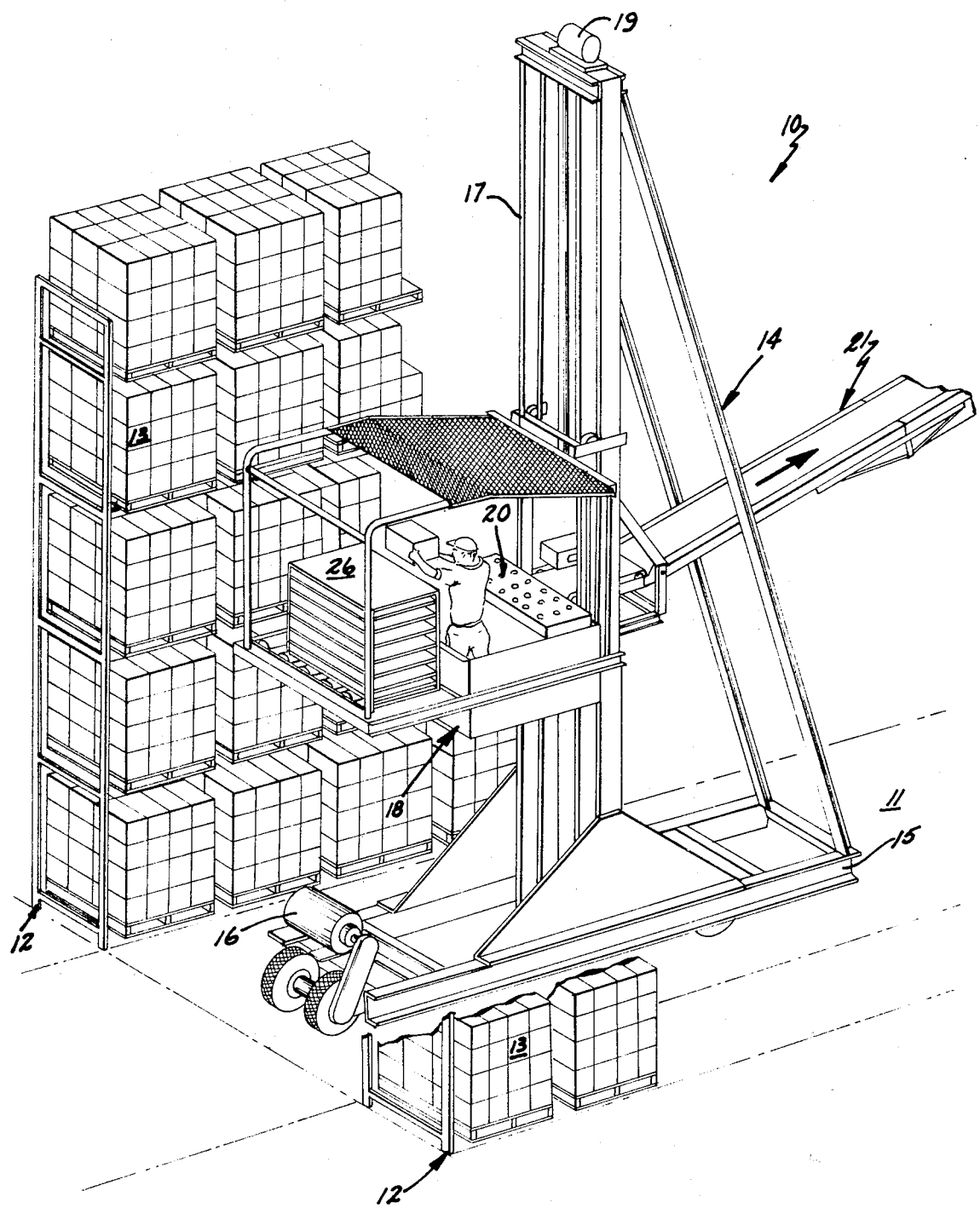
Figure 1B:
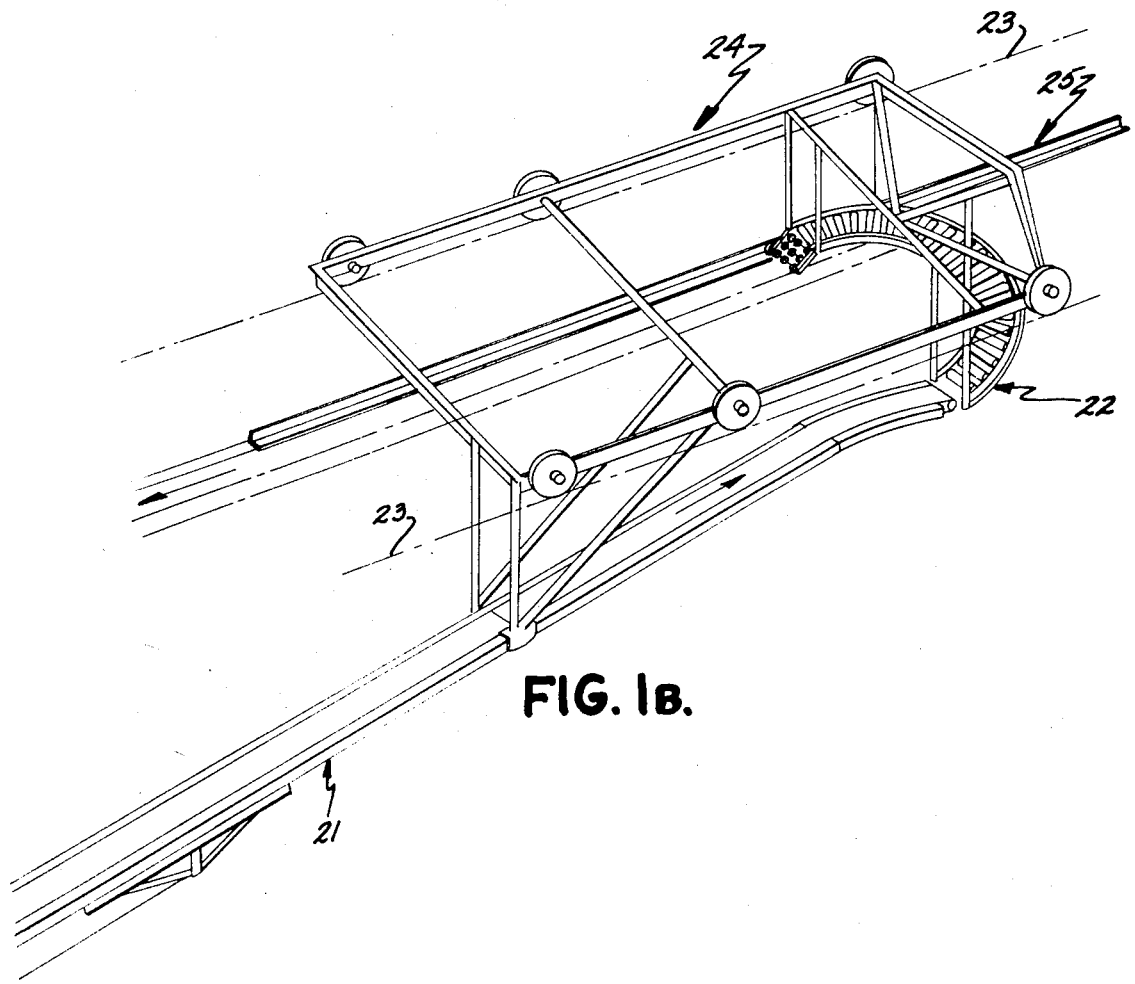

Referring initially to FIGS. 1A and 1B, the preferred embodiment of the system includes a warehousing area, indicated generally by the reference numeral 10, having a series of aisles 11 therethrough bounded on either side by article receiving racks 12. The racks are divided into individual bays into which the articles are placed for storage and picking in palletized lots. Each of the bays or each selected grouping of bays, ordinarily, will contain cartons of a specific product and the location of that product within the warehouse may be referred to, for example, by level and bay number, slot number and aisle side, or the like.

The picking vehicle, indicated generally by the reference numeral 14, comprises a wheeled base 15 powered by a suitable reversible motor and drive 16. The unit, ordinarily, will be guided along aisle 11 by tracks or the like. A column 17 extends in upright fashion from base 15 and supported upon the column, in vertically slidable fashion, is a picking platform 18. The platform 18 is raised and lowered into vertical registry with the various bays or slots by means of a suitable lift mechanism 19.

The picking platform contains space for the operator to move about such that, in the manner to be described hereinafter, he may pick cartons from the various bays or slots on either side of aisle 11 and place them onto the carton receival station 20 as the unit moves along aisle 11. Depending upon the width of the aisle 11, it may be desirable to provide structure whereby the picking platform may be moved from side to side in order to permit the operator to select items with maximum ease and, thereafter, place them up onto the table 20. It may be desirable, on the other hand, to provide some means within the slots 13 whereby the cartons migrate to the front depending upon the particular warehousing environment in consideration.

After the individual cartons are placed onto the receival station 20, they are processed in a manner to be described hereinafter in detail and routed to a pivotable elevator conveyor 21. Elevator conveyor 21, as illustrated in FIGS. 1A and 1B, rises by way of a powered curve 22 to an output conveyor 25. The pivotable elevator conveyor and curve 22 are movably supported on overhead tracks 23 by means of a trolley structure 24. The discharge extremity of the powered curve 22, thus, is free to move along the aisle 11 with the picking unit or vehicle 14, the height variations of the picking platform being accommodated by the pivotable nature of elevator conveyor 21. Once the cartons leave the cart receival station in the manner to be described, thus, they are automatically routed to the output conveyor 25 for subsequent processing.

In the picking vehicle embodiment shown in FIGS. 1A and 1B, there is provided a pallet storage area 26 on the picking vehicle, it being contemplated that the operator will remove empty pallets from the storage racks permitting, for example, another pallet to slide down or be pulled forward into picking position. It will be desirable in many situations, of course, to utilize another mode of pallet replacement. One such mode, for example, dictates the utilization of two slots for a single produce, the pallets being replaced from the rear side of the picking area by an overhead crane, forklift truck or the like. In such a situation, of course, the empty pallets are removed from the rear of the racks 12 and no space need be provided upon the picking unit for removed empty pallets to be stored.

In the typical situation, the warehouse 10 and, thus, the aisle 11, will be rather long and one picking vehicle 14 will be provided for each aisle. The racks 12 will be serviced from the rear sides and, thus, a service aisle will be provided between each pair of picking aisles 11. An output conveyor 25 will be provided for each aisle and these conveyors will join in any conventional fashion onto a sorting conveyor where the individual cartons will be routed to the particular marshalling area to which they have been addressed by the coding system to be discussed.

The picking unit, of course, moves along the aisle 11 and the operator working from side to side picks the particular cartons desired. It is advisable, ordinarily, that a particular vertical level be traversed along the complete length of the aisle and such a mode of operation may be programmed into the picking sequence in the manner to be desired.

Referring now additionally to FIGS. 2, 6, 7, and 8; the carton receival station 20 positioned upon the picking platform 18 includes a receiving table 30 having a plurality of free castors 31 affixed to the input end of the bed of the table. The cartons picked from the individual storage bays are manually pulled onto this table by the operator. It is fully within the contemplation of this invention to provide a means whereby this mechanism or table may be brought adjacent the individual bays or slots in order to minimize operator lifting.

Figure 2:
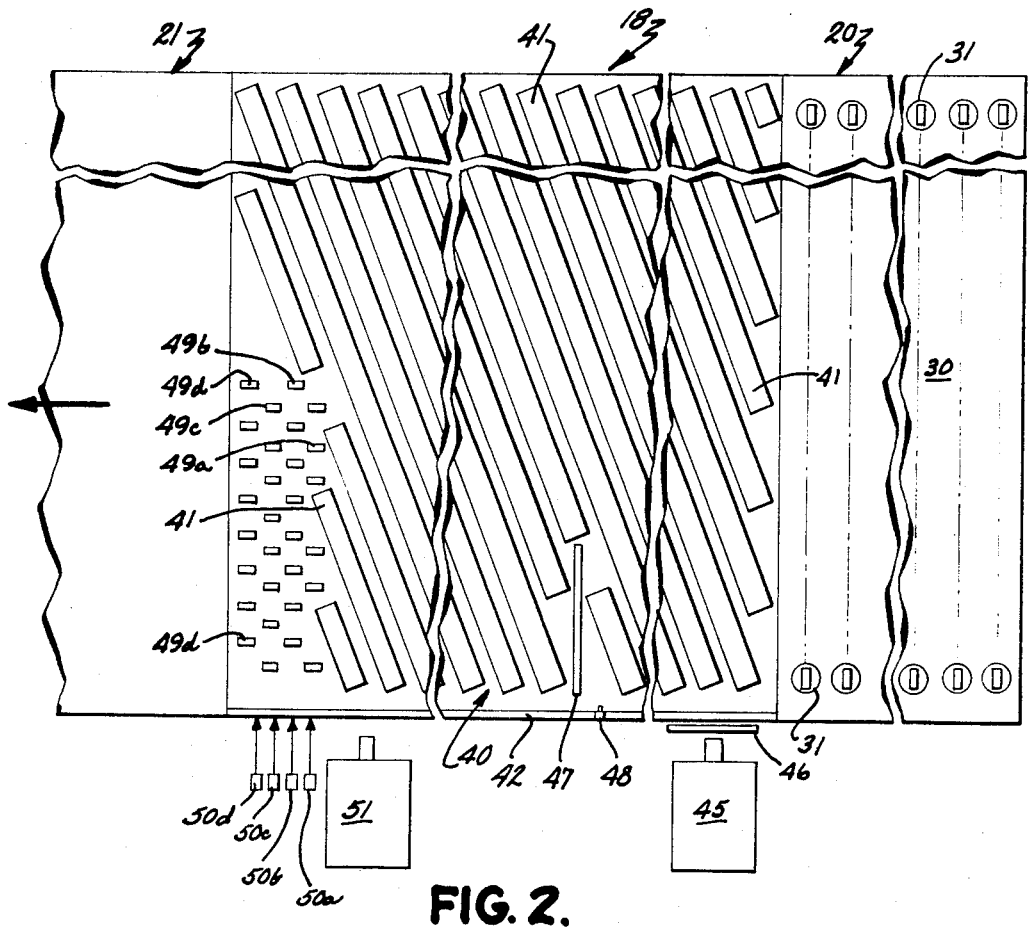
FIG. 2 is a broken, fragmentary, plan view of the picking unit table and the elevator conveyor.
Figure 8:
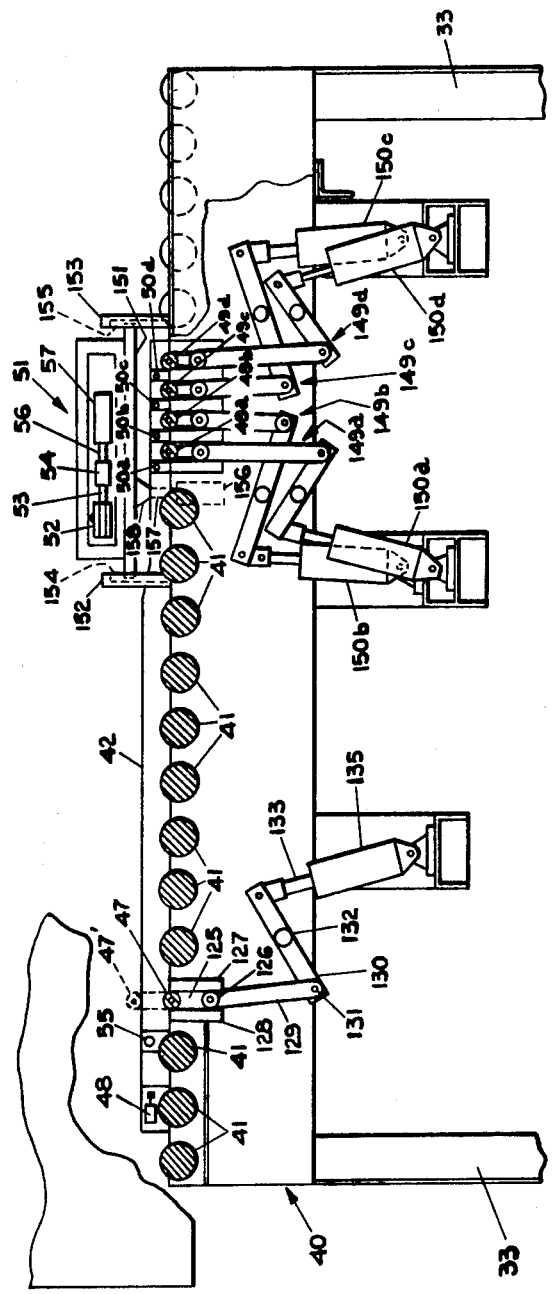
FIG. 8 is a cross-sectional side view of the picking unit table shown in FIG. 2 taken in a direction perpendicular to the flow of cartons and toward the photo cells 50a–d and code applicator 51.

Immediately forward of the receiving table 30 is the processing bed 40 which includes a series of powered skewed rollers 41 rotated, for example, by an endless belt (not shown) as is well known in the art. The processing bed 40 is supported by legs 33 (FIG. 8) at a height which is convenient for the operator. The bed 40 includes a shoulder 42 along one side thereof as shown in FIGS. 2 and 8. The skewed position of the rollers 41 is such as to force the cartons into alignment with this shoulder. Shoulder 42 also serves as a convenient mounting bracket for the various carton sensors, (FIG. 8), and is designed so as not to interfere with the operation of the labeler 45 or coder 51 mounted adjacent the edge of bed 40.

Figure 7:
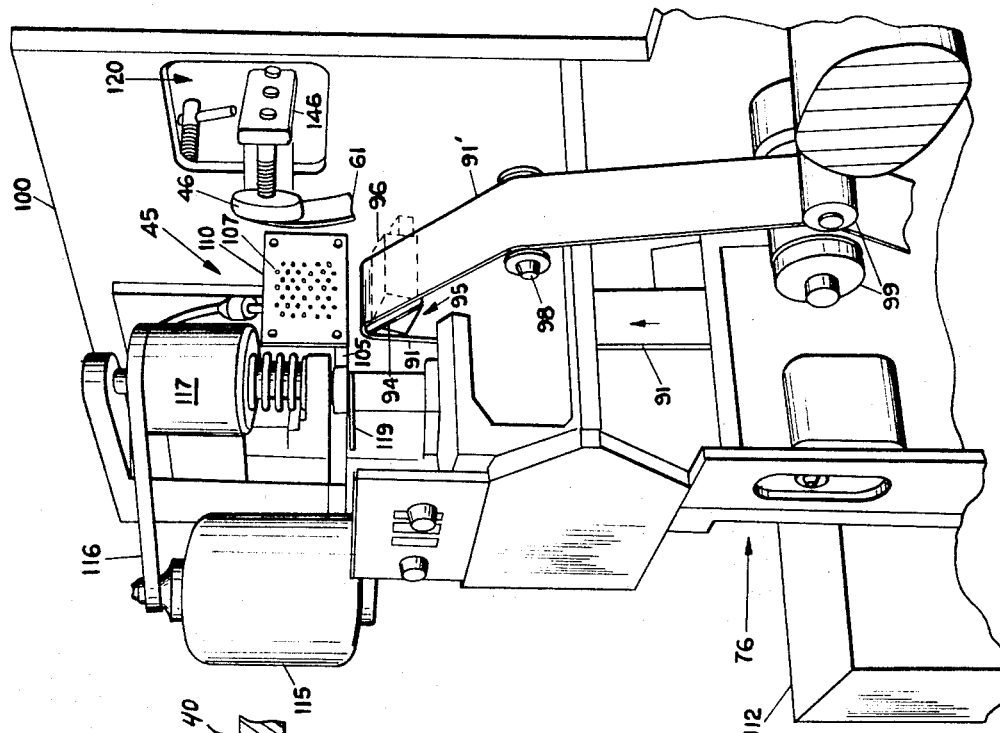
FIG. 7 is a front perspective view of the printer and labeler shown in FIG. 6 with a portion of the equipment shown in phantom form to more clearly show the threading of the label tape, the unit shown in operation whereby a label has been removed from the system by the dummy pad.
Figure 6:
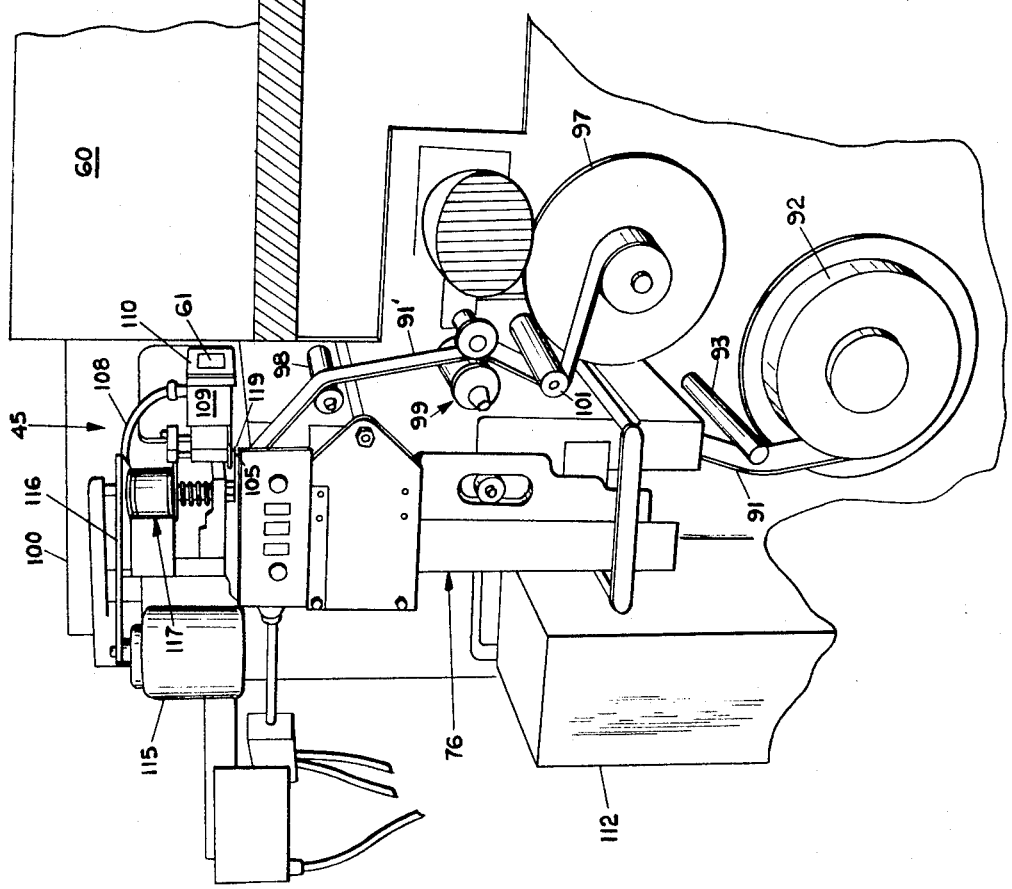
FIG. 6 is a side elevational view showing the combination printer and labeler and their position relative to a carton on the conveyor line.

FIG. 2 shows the relative placement of the labeler 45, coder 51, and the various other components of the system which are shown in greater detail in FIGS. 6, 7, and 8. Referring now briefly to FIG. 2, positioned to the side of the processing bed 40 is a label applicator 45 and printer unit (not shown in FIG. 2). This applicator, as will be noted in detail hereinafter, receives the labels printed by the digital printer positioned therebelow and placed them onto the cartons. The label applicator includes, additionally, a dummy pad 46 retractable into or extendable out of a position whereat it will intercept the label on the applicator. The purpose of the dummy pad 46 is to receive labels which are not to be placed upon cartons because of the out-of-stock condition discussed hereinafter.

The processing bed 40 also includes a label position stop 47 which is retractable to the supporting plane of the rollers 41. An alignment limit switch 48 is positioned along shoulder 42 for purposes of sensing when the length of the carton, due to the action of the skewed rollers, the operator and the stop 47, has come into abutment with shoulder 42. Depression of alignment switch 48 activates the label applicator in the manner to be described hereinafter.

Positioned forwardly of the label position stop 47 are a series of retractable code position stops 49 which, in the preferred embodiment are retractable rollers. Four aligned sets of these code position stops 49a, 49b, 49c and 49d are provided. Each of the stops can be raised to halt movement of a carton in abutment with the shoulder 42 at a specified position relative to a code applicator 51. Code applicator 51 is positioned to place a segment of reflective tape on a carton positioned therealong. Applicator 51 is mounted so as to be vertically shiftable (by means such as an air cylinder or the like) between upper and lower positions as discussed hereinafter. The presence of the carton in question at the stops 49a, 49b, 49c and 49d is sensed by code stop sensors 50a, 50b, 50c and 50d respectively. These sensors, preferably, are photoelectric cells.

Referring now in detail to FIGS. 6 and 7, it is seen that the labeler unit 45 is physically mounted above a digital printer 76 such that tape 91 from a supply reel 92 can be threaded upwardly through the digital printer 76 and thence into the labeler 45. The tape 91 comprises a paper portion with an adhesive layer applied to a backing material such that once the backing material is removed from the tape, the tape can be applied so that it will adhere to the surface to which it is applied. The tape 91 is directed upwardly into the digital printer 76 by means of a guide roller 93 and enters the printer 76 in proper orientation to be received by the printer's internal tape guides. The digital printer 76 in one embodiment was manufactured by Mohawk Data Sciences Corporation of Bridgeport, Pa., and was a MDS Series 800 type 812D-10-3A10. The printer 76 is oriented such that the tape passes through the printer in an upward direction and as it exits the printer 76, it is threaded over a sharp apex 94 of a first triangular block 95 and then downwardly between a slot formed between the first triangular block and an adjacent triangular block 96 shown in phantom form in FIG. 7. It is noted that these blocks as well as the other equipment associated with the labeler and printer are mounted on a base plate 100 which is securely attached to the picking car. As the tape is directed downwardly through the slot formed between the two triangular blocks, the adhesive paper on which the printing has been completed, is separated from the backing material 91' which is then fed downwardly into the takeup reel 97 by means of a guide roller 98, a pair of guide rollers 99, and an additional guide roller 101.

As the preprinted paper portion of the tape 91 separates from the backing 91', a vacuum head 110 grips the preprinted paper portion of the tape by means of a plurality of apertures 107 (FIG. 7) which are communicant with a chamber 109 behind the vacuum head which is coupled to a vacuum pump (not shown) by means of a vacuum hose 108. The preprinted paper portion of the tape 91 is cut into an individual label by means of a flying knife apparatus comprising a drive motor 115 coupled to an electrically operated clutch assembly 117 by means of a drive belt 116. A knife blade 119 is mounted to a shaft 118 extending from the clutch assembly 117 and is oriented in a horizontal plane such that when the clutch assembly is actuated, the knife blade will rotate in the space between the top of the pair of triangular blocks 95 and 96 and the bottom of the vacuum head 110 to sever the paper portion of the tape 91 into an individual label.

The vacuum head 110 and associated vacuum chamber 109 is slidably mounted on a carriage assembly 105 which is pneumatically operated between a retracted position to receive the label from the printer, and an extended position to apply the label to the carton. As shown in FIG. 6, the vacuum head has a label 61 thereon and is moving toward a carton 60 resting on the bed 40 of the unit.

The base member 100 includes an aperture 120 which is in approximate alignment with the vacuum head 110. Mounted to the base member 100 at one edge of the aperture 120 is the dummy pad 46 which is rotatably mounted on a pivot arm assembly 146. The pivot arm assembly is pneumatically operated to swing the dummy pad forward to contact the vacuum head 110 and remove a label 61 therefrom as shown in FIG. 7 when the required item is out of stock. The various electrical control circuits for the labeler, the digital printer, dummy pad, cutting knife, and the other equipment on the processing bed can be conveniently mounted in a control box 112 shown in FIGS. 6 and 7. In addition to the label printer and applicator, the processing bed 40 includes a coder, and various sensors and stops which are shown in detail in FIG. 8.

Referring now to FIG. 8, there is shown the left portion of the processing bed including the alignment limit switch 48 and the coder 51 of FIG. 2. As seen in the figure, the switch 48 can be a limit switch mounted on the shoulder 42 such that a carton directed toward the edge of the shoulder by means of the skewed rollers 41 will trip the switch 48. Stop 47 comprises an elongated roller coupled to a raising assembly comprising a first link 125 coupling the roller 47 to a pivot 126 which is slidably mounted between guide sleeves 127 and 128. Stop 47 can be raised to its upward position shown as 47' in dotted lines in FIG. 8 by means of a second link 129 pivotally coupled to a third link 130 by means of a pivot 131. The third link 130 pivots about a fixed pivot point 132 and has the end remote from the pivot 131 coupled to a shaft 133 of a pneumatically operated cylinder 135. As the pneumatic cylinder is actuated and shaft 133 extends or retracts, the roller 47 will lower into its position shown in solid lines, or raise into position 47' shown in dotted lines respectively.

Each of the code stops 49a through 49d similarly include raising and lowering mechanisms 149a through 149d which include pneumatically operated cylinders 150a through 150d for raising and lowering the code stop members 49a through 49d respectively. The mechanism for each of the code stops is identical to the mechanism described in detail for the position stop 47. A photo cell 55 is mounted on the shoulder 42 between the alignment limit switch 48 and the label stop 47 and is actuated by a light source (not shown) across from the processing bed such that the light beam from the light source will be intercepted by a carton placed at the labeling station. In addition to photo cell 55, the processing bed includes the photo cells 50a through 50d which serve as code stop sensors and are placed just forward of the individual code stops 49a through 49d respectively so as to detect a carton held in position by the associated code stops 49a through 49d.

The coder assembly 51 comprises a commercially available retro-reflective coder manufactured by the 3M Corporation, Model No. RP-625-R. The coder unit 51 includes a supply reel 52 on which the retro-reflective tape 53 is wound. The tape 53 is fed by guide means (not shown) to a label application pad 54 which is actuated by means of a shaft 56 coupled to the actuation means 57 such that when the applicator receives an apply signal, the applicator pad 54 will extend forwardly (out of the plane of the drawing) to apply a portion of the retro-reflective tape 53 to the carton positioned by the label stops 49a through 49d. The two-level code is obtained by mounting the coder 51 to a platform 151 which is slidably mounted between support members 152 and 153 and by means of grooves 154 and 155 in the support members respectively. The platform 151 is raised and lowered by means of a pneumatic cylinder 156 which is coupled to the platform by means of a shaft 157 which is attached to the lower side of the platform by means of a reinforced coupling member 158. As the cylinder 156 is actuated, shaft 157 will extend or retract therefrom to raise the labeler 51 to its first coding position or lower the code applicator 151 to its second coding position. By providing the four horizontally spaced code stops and the two vertically spaced code stops, therefore, a unique eight position marshalling code comprising but one piece of tape can be obtained.

Figure 3:
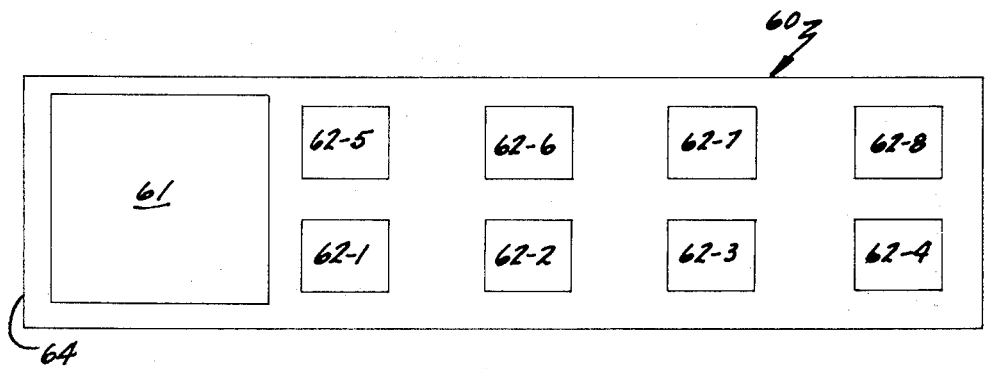
FIG. 3 is a side-elevational view of a typical carton illustrating possible label and destination code positions thereon.

Referring now to FIG. 3, there is illustrated the side of a typical carton 60. This side, for purposes of the utilization of certain aspects of this invention, is divided into a label area 61, a series of lowered code areas 62-1, 62-2, 62-3, 62-4, and a series of upper code areas 62-5, 62-6, 62-7, and 62-8. The label area, ordinarily, will lead the carton along shoulder 42. The code applicator 51, which is adjustable vertically between the lower areas, 1, 2, 3 and 4 and the upper areas 5, 6, 7 and 8 will apply a code to a specified area upon the box. This code, in the preferred embodiment of this invention, as noted, is a segment of retro-reflective tape.

Figure 4:
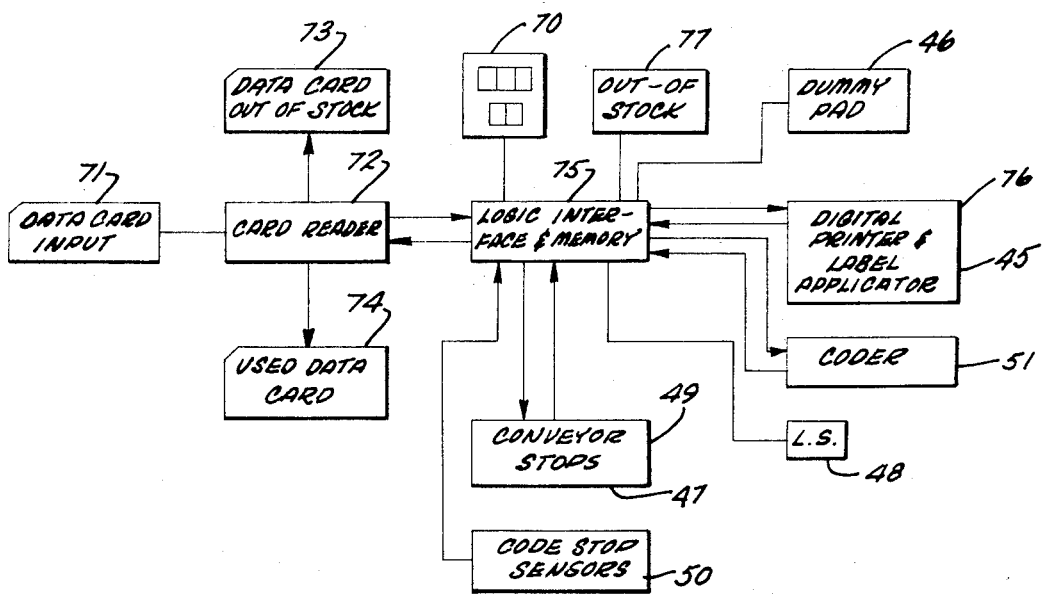
FIG. 4 is a block diagram of a first direction and control scheme for the system.

FIG. 4 illustrates one of the operational modes of the warehousing system. This particular mode contemplates the prepunching of a series of data cards, one for each item to be picked and the arrangement thereof in a series convenient for optimum picking effectiveness along the various aisles and slots of the system. Each of the cards contains punched information relating to the particular item to be picked, the particular bay within which it is stored, the material to be inscribed upon the label applied thereto and the particular marshalling area to which it is to be sent. In the preferred embodiment of the invention, for example, there are eight separate locations 62 to which the coding tape may be applied and, ordinarily, tape at a specified one of these locations will indicate to the sorting apparatus that the carton is to be sent to one of eight separate marshalling areas. During any given picking period, thus, the batch of data cards being utilized will relate to orders for eight separate stores it being possible, of course, to expand or reduce this number as desired by utilizing different coding patterns or the like.

The visual display unit 70 (FIG. 9) includes digital outputs information such as the level at which the operator is to begin the picking operation. This information is presented by means of a level display 126 on the upper left corner of the unit 70. To the right of the level indicating output, is the digital bin number display 127 which shows the operator which bin number contains the articles to be picked. Since the bins are to the left and to the right of the aisle, the display unit 70 additionally includes a left and right indicating lights 128 and 129 respectively, one of which will be illuminated such that once the operator has reached the proper bin location he will pick either from the left as indicated by the illuminated left lamp 128 or the right-hand side if lamp 129 is illuminated. Thus, the top row of output information of the display unit 70 provides the operator with location information on articles to be picked.

The display unit 70 additionally includes a digital output display 130 which provides the operator with a digital readout of the number of items remaining to be picked. As noted below, as the operator picks a carton and it is automatically labeled, this quantity remaining display will decrement automatically with the operation of the labeler such that the remaining boxes to be picked will be continuously updated during the picking operation. In the event the articles to be picked are out of stock or the entire order cannot be filled, the operator can press the out-of-stock button 77 on the display unit 70 which will operate the dummy pad to collect the remaining labels and reject the remaining punched cards such that a new item can be picked by the operator as explained in greater detail below. Unit 70 can be mounted in any convenient location on the picking car shown in FIG. 1A.

The display unit 70 is coupled to a data card reader 72 which in one embodiment was a Mohawk Data Sciences Corporation card reader Model MDS-6002, which includes an input bin 71 (FIG. 4) and which was modified to have a used-card output bin 74 and an out-of-stock bin 73. Information read from the individual data cards is routed to the logic interface 75 and then to the visual display unit 70 as described below.

Figure 10:
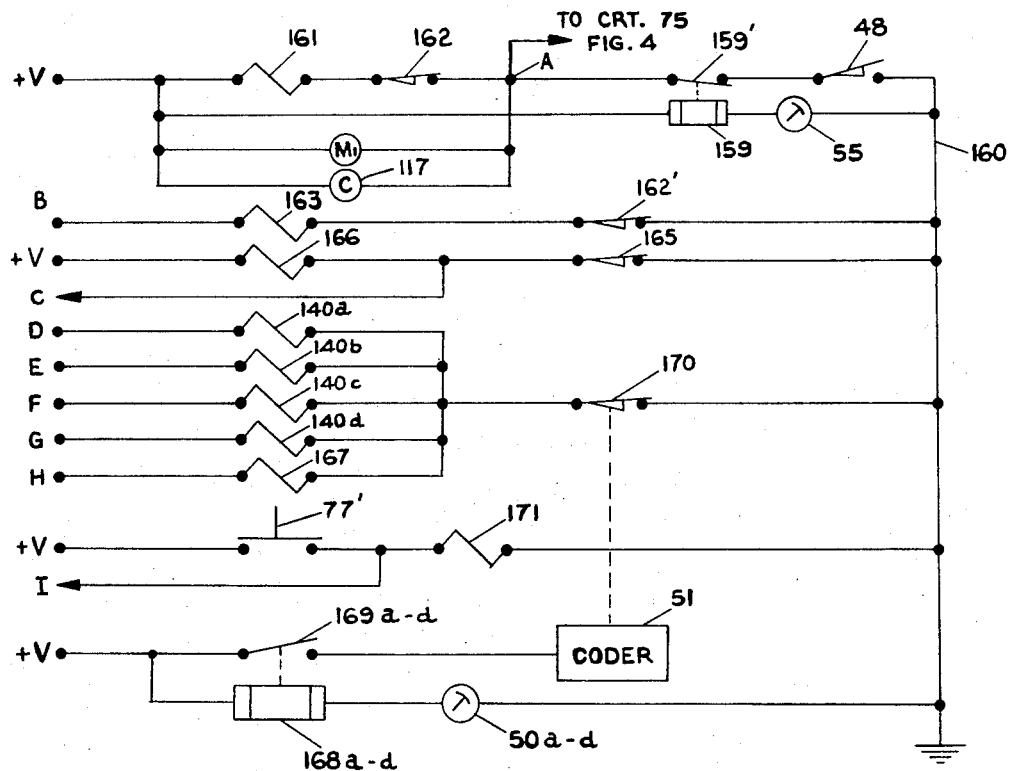
FIG. 10 is an electrical circuit diagram partially in block and schematic form showing the control circuits for the system.

In the operation of the system under the program illustrated in FIGS. 4 and 10, the card representing the first article to be picked (article No. 1) is transferred into the card reader 72. The card is read and the label printer activated by a signal from reader 72 to print the label for article No. 1 which label may include, for example, the name of the store to which the article is to be sent, the stock number and the like in legible form. During the time that the card for article No. 1 is in the reader, there is read the marshalling area (or retro-code location) information to which article No. 1 is to be sent. This information is stored in the memory circuits of circuit 75. Card No. 1 is then transferred out of the reading portion of the card reader although, at this time, it is not routed to either receptacle 73 or 74.

The card for article No. 2 is then fed into the reading portion of card reader 72 from the input 71 and, again, the label printed and the information regarding the destination of article No. 2 read and stored. At this point, the labels for articles No. 1 and No. 2 have been printed, and the marshalling code information has been stored in the memory system, but no actual picking has been effected.

It is noted here that cards No. 1 and No. 2 do not contain the visual data information for articles No. 1 and No. 2. Card No. 3, however, contains the real time visual display data for the article corresponding to card No. 1. Card No. 4 likewise will contain the real time visual data information for the article corresponding to card No. 2. Thus the visual location data for an article will be printed on the second succeeding card of the stack of input cards such that the delay between the actual labeling and the visual display necessitated by the distance which the paper tape 91 (FIGS. 6 and 7) must travel between the digital printer 76 and the labeler 45 is automatically compensated for by the sequence of data cards (i.e., program). When utilizing this scheme, of course, it is necessary to provide two "dummy" data cards at the end of the stack as a means of advancing the information for the final two cartons to the visual display and code applicator mechanisms. It is necessary, additionally, to program the card reader 72 to advance the first two cards automatically. They may be advanced, thereafter, by placement of a carton against the limit switch 48 or by any other convenient means.

Figure 9:
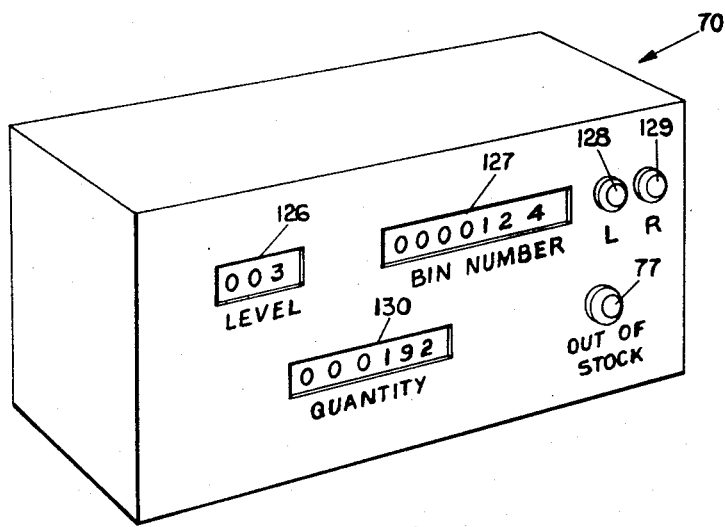
FIG. 9 is a front perspective view of the display unit mounted on the picking car of FIG. 1A.

The existence on a data card of article-location data which is to be visually displayed, is detected by the card reader 72 which converts the punched holes in the card into digital electrical signals which are applied to the visual display unit 70 of FIG. 9 and specifically, are employed to actuate the digital readouts 126 to 130 (FIG. 9) to provide the operator with a visual signal which corresponds in real time to the label which is in position for application on a carton. It is noted that the term "quantity remaining" refers to the numbers of identical articles which are to be picked from a given location within the system. If, for example, nine cartons of X brand canned goods are to be picked, there would be nine separate cards but each of the cards would contain information in descending order as to the number of like articles remaining to be picked. This information merely permits the operator to have advanced notice as to when he must move the picking unit to a new location and, of course, generally speeds and improves the efficiency of the picking sequence.

With the card for article No. 3 in the card reader, the operator views the visual display 70 and moves the picking unit to the particular location within the aisle indicated. He then picks a carton of the goods from the storage bay or slot and places it on the receiving table 30 sliding it across the free wheeling castors or balls 31 and onto the processing bed 40 in a predetermined manner of orientation. The powered skewed rollers 41, causes the carton to come into abutment with shoulder 42. The carton then contacts stop 47 which is normally in a raised position. The limit switch 48 is triggered by the carton as is relay 159 as the carton interrupts the light beam to photocell 55 (FIG. 8). Relay 159 has contacts 159' which are normally held open when light strikes photocell 55 and close when a carton 60 is in the labeling area. With switch 48 and relay contacts 159' closed, a circuit path is completed from a voltage source +V shown in FIG. 10 to a grounded bus line 160. This path includes closed contacts of a limit switch 162 (discussed below), and a solenoid 161 which is actuated thereby to couple the vacuum source to the vacuum head 110 (FIG. 6) so as to allow the head to hold the first label as it comes into position.

Simultaneously, terminal A, shown in FIG. 10, which is coupled to the logic and memory circuit 75 of FIG. 4 provides a grounding signal which is coupled to the logic and interface circuit 75 to actuate the card reader and digital printer 72 and 76, respectively. Also, at this time the closed limit switch 48 and relay contacts 159' activate the motor M1 coupled to the +V source. Motor M1 is a step motor having a shaft coupled to the take-up reel 97 (FIGS. 6 and 7) so as to advance the paper tape 91 upward through the printer and labeler as the label is printed. At this time in the sequence of operation, label No. 1 has been printed and is held into position on the vacuum head 110 of the labeler 45 and label No. 3 is being printed. The photocell 55 acts as a check to ensure that the labeler will not be actuated unless a box is indeed in position.

Also coupled between terminal A and the voltage source +V, is the clutch unit 117 shown in FIGS. 6 and 7 which operates the knife 119 to cut the label 61 from the tape 91 so that it may be applied to the carton which is now in position. The clutch unit 117 has a built-in delay such that it will operate only after the tape 91 has advanced and the label is in position and held to the vacuum head 110. The grounding signal at terminal A which is applied to the logic circuit causes the logic circuit to provide an actuation signal which is applied to terminal B of FIG. 10. This signal which is produced after the clutch 117 is operated, actuates solenoid 163 through closed contacts 162' to apply pneumatic pressure to the movable carriage assembly 105, thereby causing the vacuum head 110 to extend outwardly and come into contact with the carton 60. The carriage assembly includes the limit switch 162 which is in series with the solenoid 161. Switch 162 is normally closed, but opens when the vacuum head is extended such that once the carriage assembly 105 is extended, the solenoid 161 is deactivated and the vacuum holding the label to the head 110 is removed thereby facilitating the application of the label to the carton.

Simultaneously, a second contact, 162' on the limit switch 162, which contact is in series with the solenoid 163, opens to remove power to the solenoid 163 such that the spring loaded extended carriage arm 105 is allowed to retract. The carriage arm assembly 105, shown in FIGS. 6 and 7, further includes an additional limit switch 165 which is actuated momentarily when the carriage arm assembly is retracted to apply power to the solenoid 166 which in turn actuates the pneumatic cylinder 135 (FIG. 8) such that the label stop 47 will be lowered allowing the powered rollers 41 to advance the carton 60 out of the labeling area. The solenoid has a latching mechanism which holds stop 47 down until the carton has cleared the labeling area. The momentary closed switch 165 also provides a grounding pulse signal that is applied to the logic and memory circuit 75 by means of the interconnected terminal C (FIG. 10). This signal provides an enabling signal to the memory circuits therein such that the memory circuits are interrogated and provide control signals in response to the stored code information via interconnected terminals D, E, F and H to one of the code stop solenoids 140a through 140d so as to operate one of the pneumatic cylinders 150a through 150d shown in FIG. 8. Thus as the carton leaves the labeling area it will come to rest positioned against the raised one of the four code stops. The logic and memory circuit 75 will simultaneously provide a signal via terminal H interconnected to solenoid 167 which operates the cylinder 156 (FIG. 8) such that the coder 51 will be in one of the upper or lower coding positions as required for the preselected marshalling code. The limit switch 162 (discussed below) is normally closed and completes the electrical circuit for the solenoids 140a through 140d and 167.

Continuing now with the description of the coding application, once the carton 60 is in contact with the preselected raised code stop, one of the photocells, 50a through 50d, associated with that individual stop, will have its light beam interrupted such that its associated relay one of the relays 168a through 168d (shown in FIG. 10 as a single relay, it being understood that one relay for each of the individual code stops is provided), will be actuated and one of the associated relay contacts 169a through 169d is closed. With one of the relay contacts closed, a signal is applied to the labeler unit 51, shown in FIG. 10 as a block diagram, to actuate the labeler such that a piece of retro-reflective tape is applied at one of the eight possible positions (shown in FIG. 3) on the carton 60. Unit 51 includes a limit switch 170 mechanically coupled to the actuation means 57 (FIG. 8) of the labeler 51 and which is electrically coupled in series with the code stop actuation solenoids. Once the retro-reflective tape has been applied and the actuation means 57 returned to its rest position, the switch 170 is momentarily opened, thereby unlatching the one of the activated solenoids 140a through 140d such that the code stop which was previously in its raised position is lowered to allow the carton, which now has an applied label and marshalling code thereon, to continue along the conveyor and be routed via the elevator conveyor onto the output conveyor 25 shown in FIG. 1A. A new cycle is then initiated.

The operator will continue to pick articles and place them onto the processing bed or station 40 in the manner indicated. The articles have the label and marshalling code applied to them and are routed via the elevator conveyor onto the output conveyor 25. The cartons are then sorted into their predetermined marshalling areas by any conventional sorting and diverting conveyor mechanisms which detect the retro-reflective tape indicating a preselected marshalling area.

In the event the operator has reached a storage bin to pick the desired articles and no articles are present in the bin, he will push the out-of-stock button 77 on the display unit 70 (FIG. 9). When the push button 77 is momentarily actuated, a pair of contacts 77' shown in FIG. 10 are closed to apply power from the +V source to a solenoid 171 which actuates the pivot arm assembly 146 for the dummy pad 46. The dummy pad 46 will swing out and contact the vacuum head 110 thereby picking off the label 61 which has been preprinted as shown in FIG. 7. By depressing the out-of-stock button 77 such that contacts 77' are momentarily closed, a pulse is applied to the logic circuit 75 by means of the interconnected terminal I. The logic circuit has the number of articles remaining to be picked in its memory circuits. Upon receiving a pulse from terminal I, the logic circuit develops a series of pulses which correspond to the remaining number of items to be picked but which are out-of-stock. These pulses can be applied to control the dummy pad solenoid 171 and other units such that in the event a plurality of articles are to be picked from the selected bin and none are present; the visual display 70, the printer 76, and the card reader 72 will be actuated until all of the remaining cards associated with the out-of-stock item have been cleared from the card reader and diverted into the out-of-stock bin 73 (FIG. 4) and the remaining labels collected on the pad 46. Thus, the operator need not continually press the out-of-stock button for each remaining article to be picked when the article is not present in the storage location.

This sequence of operation can also be effectuated after some of the articles in the storage location have been picked but there are not enough articles to meet the required total number of articles. Again, the out-of-stock cards corresponding to the number of articles remaining to be picked will be shunted into the out-of-stock bin 73 instead of the used data card bin 74 and the dummy pad will be actuated to pick the preprinted labels as they are printed off of the vacuum head 110 as shown in FIG. 7. The data cards in bin 73 thereby provide inventory information which can be employed to reorder the out-of-stock items.

Figure 5:
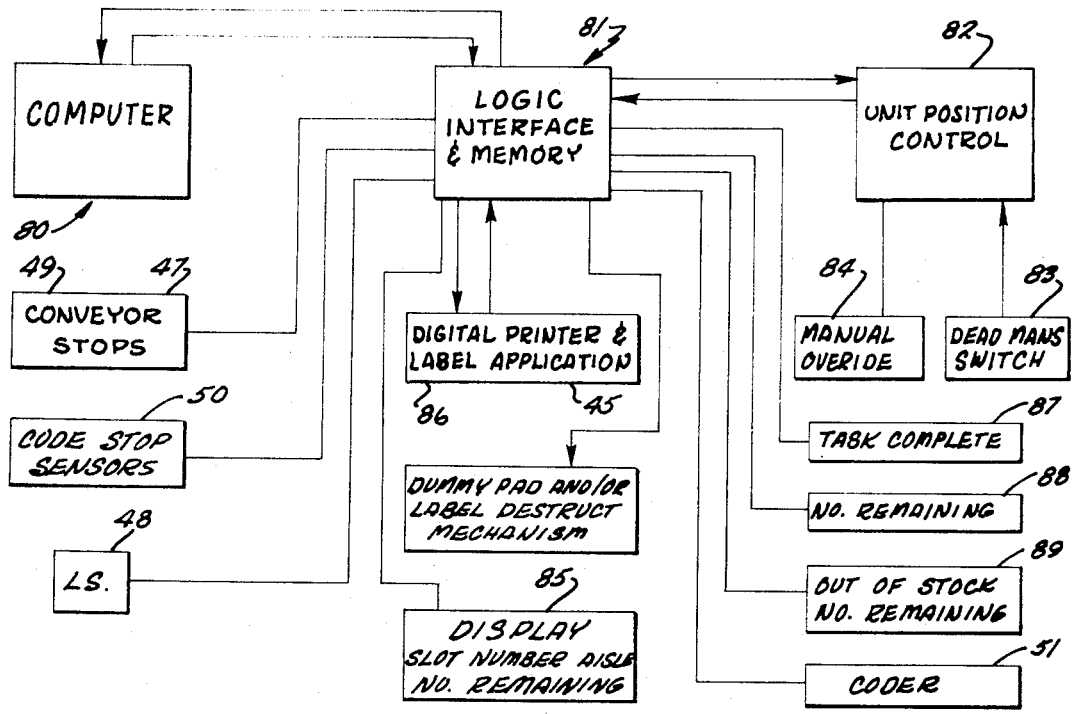
FIG. 5 is a block diagram of an alternative direction and control scheme for the system.

FIG. 5 illustrates a modified component program for system operation. In this particular situation, a computer 80, located at any convenient location within the warehouse, communicates directly with the picking unit by means of a flexible cable, radio transmitter or the like. The system includes a logic interface 81 on the unit and a picking unit position control section 82 of conventional design. The picking unit is adapted to move automatically to the proper bay or slot within the warehouse aisle under direction of the computer for each particular picking operation. There is provided on the unit, in this regard, a dead man's switch 83 for depression by the operator whenever the unit is to function automatically and, additionally, suitable manual override controls 84.

The unit is provided with a visual display unit 85 similar to that shown in FIG. 9 and discussed in connection with the system of FIG. 4. This unit, of course, is positioned on the picking vehicle so as to be easily viewed by the operator and, displays the slot or bay number, the aisle side by means of an arrow and the number of articles remaining to be picked from that particular location. As discussed in connection with the embodiment of FIG. 4, a digital printer 86 is positioned on the picking unit so as to feed the labels printed thereby to the label applicator 45.

There are provided on the picking unit for selective operation by the operator, additionally, a "task complete" switch 87; a "number remaining" switch 88 and an "out-of-stock number remaining" switch 89. Through the switches, as will become apparent hereinafter, the operator of the picking unit is capable of communicating with the computer 80 through the logic interface 81.

The picking unit for use with the system program of FIG. 5 can be identical in all other respects to that discussed previously in connection with FIG. 4 with the deletion, of course, of the card reader mechanism and sorter and the controls which are special to the program of FIG. 4.

When orders are received from individual stores or outlets at the central warehousing area, they are programmed into the computer 80 in such a fashion that the orders of eight separate stores are correlated for a single picking sequence. Again, as was the case in the arrangement of the punch data cards discussed previously, provision is made in the program for moving the picking unit level to level and along the aisle in the most efficient manner possible. The computer will transmit to the logic interface 81 aboard the picking unit, thus, the number, location and destination of the articles to be picked as well as the data to be typed upon the label applied thereto.

When the program for a particular picking sequence is completed and that sequence initiated, the operator mounts the picking unit, depresses the dead man's switch 83 and, if necessary, notifies the computer that he is ready to begin the picking sequence. The computer through the unit position control 82 then automatically moves the picking unit to the location along the aisle and to the level at the particular aisle position from which the first article is to be picked. There are available and well-known in the art many types of driving hardware for moving the picking unit in such a manner. Once the unit comes to a stop, the operator reviews the visual display 85, confirms that he is at the correct slot and goes to the side of the picking unit indicated by display. He then removes a carton and places the same on the processing bed 40 in precisely the same manner discussed earlier in connection with the program of FIG. 4.

Upon placement of the carton onto the processing bed 40 so as to trip the limit switch 48, the label applicator 45 applies the previously printed label thereto (the digital printer having been activated during movement of the vehicle to the picking location) and the label stop 47 lowers permitting the carton to proceed toward the elevator conveyor 21. The carton proceeds in this direction until such time as it comes into abutment with the raised set of code stops 49. These code stops along with the vertical position of the code applicator 51 are preset under instructions from the computer for the particular carton in question. When the carton comes into abutment with the particular code stop 49 in question, its presence is sensed by one of the sensors 50, and a segment of retro-reflective tape is applied to the carton at the selected position by code applicator 51. The stops 49 then lower permitting the carton to move to the elevator conveyor 21 and be routed to the marshalling area.

As soon as the operator brings the particular carton into abutment with limit switch 48, he checks the display 85 for instructions as to the next procedure. If the "quantity remaining to be picked" indication thereon indicates that another case of the same goods is to be picked, he removes another case, places it on the processing bed 40 in the manner described and it is thereafter labeled and coded in the manner described.

When the visual display 85 indicates that all cases to be picked from a particular area or bay have been so picked, the operator pushes the task complete button 87 which signals the computer that the picking unit is to be moved to the next picking location. The picking process is repeated there and from location to location within the system until the order sequence for the eight stores in question has been completed.

When all of the cases have been picked from a designated slot or bay, the instant system provides a means whereby the operator may transmit to the computer the number of cases remaining on the picked pallet if it is less than a specified number, for example, five. In such a situation, when the picking operation at a particular slot or bay is completed, the operator views the remaining cases and if there are five or less activates the number remaining control 88 to notify the computer the exact number of cases or cartons remaining on the pallet. This information may be utilized per the computer program to initiate replacement of the pallet or, if desired, to initiate replacement only if the number of articles to be picked from that particular slot or bay in the subsequent picking sequence for other stores exceeds the number then on the pallet. Utilization of the information, thus, will depend upon the program as will be readily appreciated by those skilled in the art. In any event, once the operator has keyed this information into the system through control 88, he then pushes the task complete button 87 to proceed to the next picking location.

If, for any reason, the pallet at a particular slot or bay is emptied before the display shows zero cases remaining to be picked, the operator, in the instant system, pushes the out-of-stock button 89 and keys the number of cases or cartons remaining on the display (to be picked) back to the computer. The computer records this quantity and causes the dummy retracting pad to be actuated to dispose of any labels which have been preprinted. Also the computer cancels printing of the remaining labels and brings the display to a zero reading. The computer is programmed additionally to record the information concerning the unfilled order in any desirable manner such as, for example, on an out-of-stock slip for filling in a subsequent picking sequence for the particular store involved. Once this out-of-stock information is keyed into the system through control 89, the operator depresses the task complete button 87 and the picking unit moves automatically to the next picking location.

When the picking sequence for the particular eight stores being conducted is completed, a sequence is started for another eight stores, the computer having been preprogrammed to execute the necessary functions involved.

There are, of course, numerous advantages to each of the programmed control systems illustrated in FIGS. 4 and 5. The use of a particular system or modification thereof will depend upon the particular picking environment involved. Certainly, as will be readily appreciated by those skilled in the art, the picking sequences and control thereof may be varied without departing from the spirit and scope of this invention as defined in the appended claims.

The embodiments of the invention in which an exclusive property or privilege is claimed are defined as follows.

1. In a warehouse picking system for use in a warehouse having a plurality of article storage racks for storing articles at predetermined locations therein, a mobile picking unit adapted to carry an operator thereon and being movable along said storage racks so as to place an operator thereon in a position to pick articles from said racks, means for providing information regarding the number of articles to be picked from a predetermined location and the destination and marshalling area of said article, display means providing an indication of the predetermined location of an article and the number of said articles to be picked, printer means coupled to said information providing means for printing a label containing said destination information in readable form, labeling means coupled to said printing means and adapted to receive labels therefrom, means for operating said labeling and printing means to affix a label on each of said articles as it is placed adjacent said labeling means, coding means coupled to said information providing means for affixing a machine readable code on each of said articles as they are placed adjacent said coding means so as to uniquely identify said marshalling area for said articles, and means for continuously updating the indication provided by said display means as each article receives a label and marshalling code.

2. The system as set forth in claim 1 wherein said unit includes a processing station upon which the articles are placed by an operator after removal from said racks and which is mounted adjacent said labeling and coding means.

3. The system as set forth in claim 2 wherein said processing station includes means for sensing the proper position of an article thereon and activating said labeling and coding means.

4. The system as set forth in claim 1 wherein said information providing means is mounted on said mobile picking unit.

5. The system as set forth in claim 4 wherein said information providing means comprises a series of data cards and a data card reader and feeding unit therefor.

6. The system as set forth in claim 5 which further comprises means for preparing a record of out-of-stock items.

7. The system as set forth in claim 6 wherein a data card is provided for each article to be picked and wherein said preparing means comprises means for separating the cards for the out-of-stock articles into a separate group.

8. The system as set forth in claim 7 wherein said unit includes a processing station upon which the articles are placed by the operator after removal from the racks and which includes said labeling means and coding means for applying the label and marshalling code associated with a particular article.

9. The system as set forth in claim 1 wherein said coding means comprises means for applying a reflective tape to the article at a location thereon dependent upon the particular marshalling area to which the article is to be routed.

10. The system as set forth in claim 2 wherein said processing station comprises a conveyor bed having an article orientation means along one side thereof, said labeling means and said coding means being positioned along said bed.

11. The system as set forth in claim 10 wherein said conveyor bed has a series of rotating conveying means for moving articles therealong and which further comprises stop means effective to stop articles thereon for operation of said labeling means and said coding means.

12. The system as set forth in claim 11 wherein said conveying means comprises a series of rollers skewed with respect to said orienting means whereby articles move closely adjacent said orienting means as they are conveyed.

13. The system as set forth in claim 12 wherein the stop means associated with said coding means includes means for halting the article selectively at any one of a plurality of predetermined positions with respect to said coding means.

14. The system as set forth in claim 13 which further comprises detection means for determining when an article has abutted one of said halting means and actuating said coding means in response to such determination.

15. The system as set forth in claim 2 wherein the label to be placed on a particular article is printed prior to the time that that article is picked and which further comprises dummy pad means for receiving the label from the label affixing means in the event that the particular article is out of stock.

16. The system as set forth in claim 1 wherein said information providing means is separated from said mobile picking unit and forms a part of a computer and which further comprises means for transmitting information from said computer to said mobile picking unit.

17. The system as set forth in claim 16 wherein said information providing means includes information regarding the location of the articles to be picked and which further comprises means for automatically controlling the position of said mobile unit within said system in response to such information.

18. The system as set forth in claim 17 which further comprises a first switch on said mobile picking unit coupled to said computer and adapted to be actuated by said operator and, when so actuated triggering movement of said unit to the position at which picking is to be done.

19. The system as set forth in claim 16 which further comprises means on said mobile picking unit coupled to said computer for communicating to said computer the information regarding the number of articles remaining at any given storage location.

20. The system as set forth in claim 19 wherein said communicating means further includes means for communicating out-of-stock information and means for communicating number of articles remaining information.

21. The system as set forth in claim 20 wherein said display means comprises a visual display which displays at least the location, and number of the articles to be picked.

22. The system as set forth in claim 21 wherein, at a given location, the display means displays the number of articles remaining to be picked.

23. In a warehousing system having a mobile picking unit, the unit being movable along a plurality of article storage racks for purposes, at least, of placing on selected articles a label containing predetermined information, the improvement comprising a label printing means mounted on said unit for printing the labels to be applied to the articles; means in said system for storing information to be printed on the labels for each such selected article; means for applying a code indicia on said articles to uniquely identify an area to which said articles are to be routed.

24. The system as set forth in claim 23 wherein said unit includes a processing station upon which the articles are placed by the operator after removal from the racks and which further comprises a mechanical label applicator means for applying the label associated with a particular article thereon.

25. The apparatus as code set forth in claim 23 wherein said storing, activating, and applying means are carried on said unit during the operation thereof.

26. The apparatus as set forth in claim 23 wherein said storing means is remote from said unit.

27. A method of picking and marshalling articles in a system including a warehouse having a plurality of article storage racks; a mobile picking unit having an operator movable along said storage racks to place the operator in a position to pick articles from the racks; means for storing information regarding the articles to be picked from selected locations and material to be printed on labels affixed thereto and, means for providing a marshalling code to identify the area to which an article is to be routed, said method comprising the steps of: positioning a label printing mechanism on said unit for movement therewith; printing labels to be applied to the articles in accordance with the information in said storing means; affixing the labels so printed to the articles; and applying a marshalling code to said articles.

28. In a warehousing system having storage racks, and including a mobile picking unit adapted to move along a plurality of aisles and vertically movable to be positioned adjacent any particular storage rack in said system, said mobile picking unit further comprising: a platform to accommodate an operator, a processing station for receiving cartons picked by operator, means for aligning said carton on said station, means for holding said carton at a predetermined position on said station, means for providing a visual display which indicates the storage location of a particular carton and the number of cartons to be picked, means for printing a label containing destination information thereon for each of said cartons, means for applying said printed label to said carton when it is held in said predetermined position, and means for removing said carton with a label affixed thereto from said processing station.

29. A method of picking and marshalling articles in a system including a warehouse having a plurality of article storage racks, a mobile picking unit adapted to carry an operator and movable along said storage racks to place the operator in a position to pick articles from the racks, means for providing information regarding the articles to be picked from selected locations and materials to be printed on labels affixed thereto, said method comprising the steps of: displaying the storage location of a particular article and the number of articles to be picked from said storage location, providing a processing station on said mobile picking unit, aligning and holding an article in a predetermined position on said processing station, printing a label containing destination information thereon for each of said articles, applying said printed label to said article as it is held in said predetermined position on said processing station, and removing said article once said label is affixed thereto.

* * * * *